April 28, 1959 E. O. JOHNSON 2,884,328
METHOD OF AND APPARATUS FOR PRODUCING
A TIGHTLY PACKAGED FOOD PRODUCT
Filed Sept. 16, 1954 2 Sheets-Sheet 1

INVENTOR.
Edward O. Johnson
BY Harry H. Levin
Atty

April 28, 1959
E. O. JOHNSON
2,884,328
METHOD OF AND APPARATUS FOR PRODUCING
A TIGHTLY PACKAGED FOOD PRODUCT
Filed Sept. 16, 1954
2 Sheets-Sheet 2
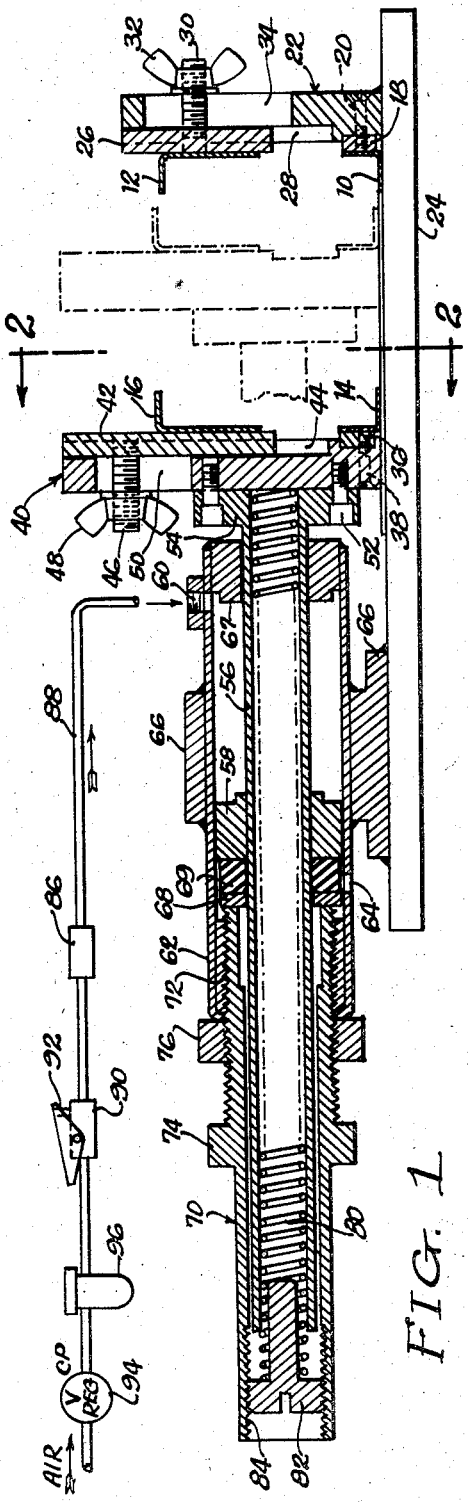
INVENTOR.
Edward O. Johnson
BY
Harry H. Levin
Atty

United States Patent Office

2,884,328
Patented Apr. 28, 1959

2,884,328

METHOD OF AND APPARATUS FOR PRODUCING A TIGHTLY PACKAGED FOOD PRODUCT

Edward O. Johnson, Chicago, Ill., assignor, by mesne assignments to Union Carbide Corporation, New York, N.Y., a corporation of New York Application September 16, 1954, Serial No. 456,376

15 Claims. (Cl. 99—171)

This invention relates to packaging. More particularly, it relates to a method of and apparatus for producing a tight wrap in a completed package.

Many food items such as cheeses and meat food products, as well as fowl and poultry, in the whole, sliced or cut up state have been packaged in transparent films. In one method, the selected film, in sheet form, was wrapped either manually or mechanically about the item. Such procedure produced a wrap which was not tight. As a consequence, interspaces were formed between the wrapper and surface of the item and constituted pockets. Air serving as a source of oxygen was entrapped in the pockets and produced undesirable results. The pockets also permitted fluids which served as nutrient broth for the growth of undesirable molds to collect therein. Moreover, because the wrap would not cling to the packaged item, it was apt to be ruptured, punctured or otherwise damaged during handling and storage and also tended to mask the true color of the packaged item.

Attempts have been made to reduce the quantity of air within the package by evacuating the package prior to the sealing thereof. Though this procedure minimized the undesirable results produced by air within the package, it however did not prevent the formation of interspaces and the other attendant undesirable features.

Still another method contemplated stuffing the item into an oversize envelope made of saran which shrinks upon the application of hot water, evacuating the air from the package, tying the open end and dipping the product into hot water to shrink the wrap. Though this procedure produced a tight wrap, it nevertheless required shrinking the wrap by means of hot water.

An object of this invention is to provide a new and improved method of and apparatus for producing wraps tightly adhering to the contents of the package.

Other objects of the invention will become apparent hereinafter.

The objects of this invention are accomplished, in general, by stretching a bag or tube formed of an elastic film in which the selected item is to be packaged and whose normal perimeter is smaller than that of the item to a perimeter greater than that of the item so that the latter can be inserted easily into the stretched bag or tube inserting the item into the bag or tube while said bag or tube is maintained in the stretched condition and thereafter releasing the stretching stress whereupon the tube or bag will of its own accord contract and form a tightly adhering wrap.

The stretching operation is obtained by inserting a plurality of fingers into the bag or tube and then imparting relative movement to the fingers in a direction to impart the desired stretch. The bag or tube may be stretched throughout its entire length. In one embodiment the bag or tube is transversely stretched only along a portion of its length and the unstretched portion aids in positioning and locating the item within the wrap.

A piston in a single acting cylinder imparts the relative movement to the fingers for the stretching operation. The return stroke of the piston is obtained by a controlled release of the air through a speed control valve by means of a spring cooperating with the piston. The speed control valve and the spring cooperating with the piston are corelated so that the force or tension of the return stroke is such that it will not cause the stretching fingers to press too tightly against the item or result in injury to the hands of the operators if permitted to remain between the stretching fingers. In practice, when the tension on the stretched tube or bag has been released by the start of the return stroke of the piston, the tube or bag, together with the item therein, is easily pulled off or pushed off the stretching fingers. The open end or ends of the tube or bag can be heat sealed, tied or twisted as desired.

The tube or bag constituting the wrap may be formed of any film which is elastic, i.e., has the property of stretching upon application of stress and self-recovery upon removal of stress. Preferably the film is thermoplastic and heat sealable, in addition to being transparent, flexible, non-toxic, printable, tasteless, imparts no undesirable odor or taste to the packaged item, strong, tough, waterproof, low moisture vapor transmission rate and gas transmission rates appropriate for the packaged item. Polyethylene film and film made of polymer (butadiene acrylonitrile copolymer) plasticized vinyl resin (vinyl chloride vinyl acetate copolymer) sold under the trademark Visten are preferred examples of elastic film which can be formed into tubes or bags for use in this invention.

The film can be in the form of seamless tubing of desired lengths, with or without gussets, and open at both ends or sealed at one end by a straight across or arc seal. The invention is not restricted to seamless tubes or bags made therefrom. It is equally applicable to tubes having a longitudinal seam obtained by overlapping the marginal edges of the film and to bags made therefrom, as well as tubes and bags made by sealing the edges of two superposed layers.

The nature of the invention will become more apparent from the following description, appended claims and accompanying drawings wherein:

Figure 1 is a longitudinal vertical section of one embodiment of an apparatus embodying the principles of this invention and showing the fingers in the expanded or stretching condition and in the non-stretching or collapsed condition (in dotted lines).

Figure 2 is a section taken on line 2—2 of Figure 1.

Figure 3 is a section taken on line 3—3 of Figure 2.

Figure 4:
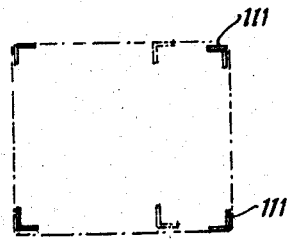

Figures 4 to 10 inclusive are cross sections of several different embodiments of stretching fingers which can be used.

Figures 11 to 14 inclusive diagrammatically illustrate several stages of the process of packing chunk sausage in accordance with this invention.

Figures 15 to 18 inclusive diagrammatically illustrate several stages of the process of packaging sliced meats in accordance with this invention.

Referring to the drawings, wherein like reference numerals designate like parts, the reference numerals 10 and 12 designate a pair of stretching fingers and the reference numerals 14 and 16 designate a second pair of stretching fingers and as will hereafter more fully be explained, means are provided to impart relative movement of the two pairs of stretching fingers in a direction away or toward each other whereby the perimeter about said fingers will be increased and decreased respectively.

In the form shown in Figure 1, stretching finger 10 is appropriately secured to finger support 18 which is in turn removably secured by screws 20 in a recess at the lower end of block 22. Block 22 is rigidly secured to supporting plate 24. Stretching finger 12 is appropriately secured to stretching finger support 26 which is adjustably disposed in slot 28 in block 22 and secured therein by stud 30 and wing nut 32. Stud 30 cooperates with elongated hole 34 in block 22 whereby upon loosening of nut 32, finger 12 may be moved up or down and accordingly adjusted relative to finger 10.

Finger 14 is apropriately secured on finger support 36 which in turn is removably secured by screws 38 in a recess at the lower end of block 40. Finger 16 is appropriately secured to finger support 42 which is adjustably disposed in slot 44 in block 40 and secured therein by stud 46 and wing nut 48. Stud 46 cooperates with elongated hole 50 whereby upon loosening of nut 48 finger support 42 may be moved up or down and accordingly finger 16 can be adjusted relative to finger 14.

Block 40 is secured by means of screws 52 to flange 54 on the forward end of hollow piston rod 56. Piston head 58 is secured to piston rod 56 and is actuated by compressed air supplied through the air supply 60 of cylinder 62 in which piston head 58 is slidably disposed. Cylinder 62 is provided with vent 64 to permit exhaust of air rearwardly of piston head 58 during actuation of piston by the air. Cylinder 62 is rigidly mounted in cylinder support 66 which in turn is rigidly secured to plate 24. Cylinder 62 is closed at the front end thereof by head 67 through which piston rod 56 extends and is slidably positioned. The rear face of head 66 may also cooperate with piston head 58 and serve as a stop limiting the return stroke of the piston.

The stroke of piston rod 56 is adjustable as will now be explained.

Rubber stop 69 is disposed on ring 68 secured to the front end of stroke adjustment cylinder 70. Stroke adjustment cylinder 70 adjacent the end carrying ring 68 is externally threaded and such threaded portions cooperate with the internal thread of bushing 72 secured in cylinder 62 adjacent the rear end thereof. Upon rotation of stroke adjustment cylinder 70 in proper direction stop 69 will be positioned as required to give the desired stroke. To facilitate rotation of stroke adjustment cylinder 70, the latter is provided with integral head 74 which is adapted to be manually engaged by the operator for imparting rotation to stroke adjustment cylinder 70. Lock nut 76 secures the stroke adjustment cylinder 70 in any adjusted position.

The return stroke of the piston is secured in part by means of spring 80 disposed in the interior of piston rod 56. The forward end of spring 80 engages block 40 and the rear end thereof cooperates with spring adjustment screw 82. The head of adjustment screw 82 is threaded and cooperates with internal thread 84 adjacent the rear end of stroke adjustment cylinder 70.

The rate of return of the piston by spring 80 is controlled by speed control valve 86 positioned in line 88 connected to inlet 60. Speed control valve 86 is of the well known type and construction which permits ready passage of the air therethrough to cylinder 62 and which has adjustable means permitting the exhaust flow of the air to the atmosphere from the cylinder at a controlled rate. Since the details of the speed control valve form no part of this invention, further description thereof is not necessary.

In line 88 and rearwardly of speed control valve 86 there is provided a two-way valve 90 of any well known construction permitting the flow of air through the line to the cylinder and permitting the air exhausted from the cylinder to exit into the air. Control valve 90 can be actuated in any suitable manner. For convenience, operation through a foot pedal 92 is preferred.

Line 88 is connected to a suitable source of supply of compressed air not shown. If desired, line 88 may be provided with pressure regulator and gauge 94 and an oiler 96 as shown in Figure 1.

In the form shown in Figure 1, stretching fingers 10 and 14 consist of angles having equal legs and fingers 12 and 16 consist of angles having unequal legs. In order to permit easy insertion in a bag or tube, fingers 12 and 16 are, as shown in Figure 3, inclined at a slight angle from the horizontal and preferably also the portion of each vertical leg projecting beyond the respective block is provided with a downward sloping edge 100. The rear ends of each of the fingers are curved outwardly as shown by the reference numeral 102 to aid in the introduction of the item to be packaged.

As previously mentioned, each of the stretching fingers projects forwardly from the respective blocks and the extent of such projection depends on the length of the bag or tube which is to constitute the wrap.

The horizontal legs of the oppositely disposed fingers may be in the same plane. Preferably, horizontal legs of fingers 14 and 16 are positioned so that they respectively will overlap horizontal legs of fingers 10 and 12 when they are in the collapsed position. A feed tray 110 is secured to the plate 24. As shown in Figure 3, feed tray 110 is provided with edge guide 112 which serves to position the items properly for introduction between the fingers and into the stretched tube or bag.

The invention is not restricted to the precise number and shape of stretching fingers previously described. Though the use of four fingers as previously described is preferred, two, six or indeed more fingers can also be used.

Figure 5:
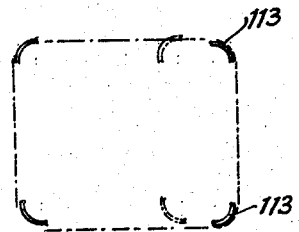
Figure 6:
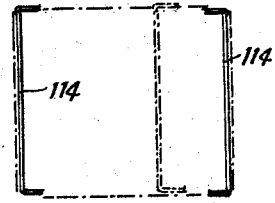
Figure 7:
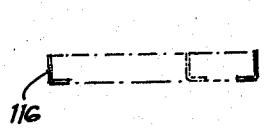
Figure 8:
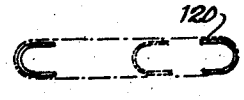
Figure 9:
Figure 10:
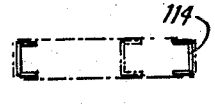
Figure 11:
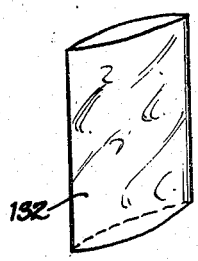

The fingers can also be in the form of angles 111 having equal legs as shown in Figure 4 or arcuate in form as shown in Figure 5 and designated by reference numeral 113. When two fingers are utilized, the fingers can be channels 114 positioned so that the flanges thereof extend inwardly as shown in Figures 6 and 10, angles 116 as shown in Figure 7, curved plates 118 as shown in Figure 8 or U-shaped members 120 as shown in Figure 9.

In using the apparatus shown in Figure 1, upper fingers 12 and 16 are adjusted to and secured in position so that the vertical distance between them and the lower fingers 10 and 14 respectively is slightly larger than the diameter or thickness of the article to be packaged therein, whereby such item can be freely rolled or pushed through the area between the four fingers into the expanded tube or bag as hereafter described. The stroke of the piston is adjusted so that at the beginning of the operation when the two pairs of fingers are in collapsed condition, the periphery about said four fingers is less than the normal periphery of the tube or bag in which the item is to be packaged so that they can be easily inserted in such tube or bag. The stroke is also adjusted so that at the end of the expansion (spreading) of the fingers the perimeter thereabout will be larger than the perimeter of the item to be packaged. Speed control valve 86 is set in accordance with the tension of spring 80 so that it will permit the air to be exhausted from cylinder 62 at a controlled rate. After the foregoing adjustments have been made, the fingers are inserted in a tube of a diameter or flat width less than the diameter of the item to be packaged as by slipping the tube over and around the outside of the fingers. Line control valve 90 is operated to permit flow of compressed air to cylinder 62 whereupon block 40 is moved to the left as viewed in Figure 1 with the result that the fingers are spread apart and the tube thereon is stretched. When the piston has reached the end of its movement, the item to be packaged is placed on the feed tray 110 with one edge in contact with edge guide 112 and then rolled or pushed between the fingers until it is properly located in the expanded tube. Valve 90 is operated to permit exhaust of air from cylinder 62. Spring 80 urges the return of the piston, however, the rate thereof is controlled by speed control valve 86.

The return stroke is at a rate faster than that at which the tube begins its recovery (contraction) from its maximum stretched position. For an interval, the tube becomes loose around the stretching fingers and at that time the tube together with the contents is removed from the fingers. After removal of the tube and contents the piston completes its return and the tube continues to recover (contract) and form itself tightly wrapped about the product. The open ends are then sealed in any appropriate manner.

Figure 12:
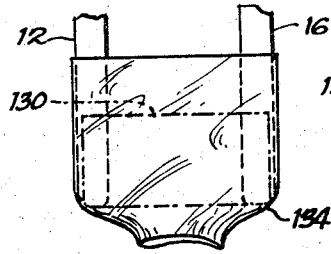
Figure 13:
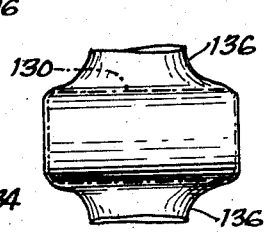

Figures 7 to 10 inclusive illustrate several stages in the packaging by the apparatus shown in Figure 1 of an item 130 such as chunk sausage of 2¾" diameter and 4" long in a flattened Visten tube 132 having a flat width of 4¼" or a total periphery of 8½". Chunk sausage is a piece of sausage of definite weight or size and having on its peripheral wall a covering such as regenerated cellulose. It is obtained by cutting a sausage in which the filling is encased in a seamless casing such as regenerated cellulose and is several times the length of the chunk. Fingers 12 and 16 are adjusted so that the vertical space between them and the lower fingers 10 and 14 respectively is 3". The stroke of the piston is adjusted so that at the beginning thereof when the fingers are in the collapsed state, the periphery thereabout is of the order of 7½", and at the end of the expansion such periphery will be 15". Tube 132 open at both ends is positioned on the fingers so that the latter does not engage the tube throughout its length, and the piston actuated so that the fingers will expand and the tube will be stretched transversely. As shown in Figure 12, the portion of the tube not engaged by the fingers will not be stretched. While the tube is in the stretched condition, the chunk sausage 130 is rolled (see Figure 2) into the stretched tube. Shoulder 134 in the stretched tube limits the movement of and positions the chunk in the tube. Thereafter, the piston is caused to make its return stroke and the tube and contents is removed from the fingers as previously described. The package at this stage of the operation is as shown in Figure 13. The two ears 136 are then folded over and secured to the package as shown in Figure 14 in any convenient manner as by heat sealing.

Figure 14:
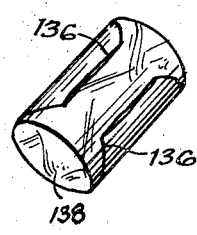
Figure 15:
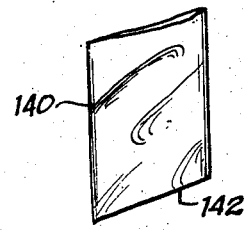
Figure 16:
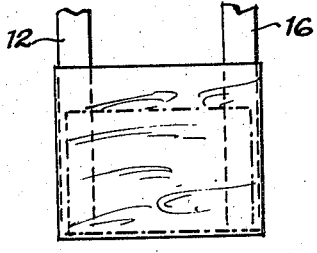
Figure 17:
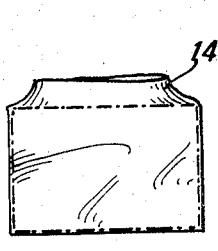
Figure 18:
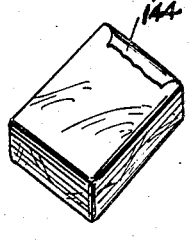

In the package shown in Figure 14, the opposite sides 138 of the container provide a skin tight covering on the cut ends of the chunk so that there are substantially no pockets of entrapped air between the cut ends and the container. The absence of air pockets prevents the collection of nutrient fluids between the container and cut surfaces and as a result prevents the growth of mold. It also eliminates the deleterious action of air.

Figures 15 to 18 inclusive illustrate several stages of the method wherein the selected item is packaged in a bag in accordance with this invention. In this embodiment, the wrapper consists of a flattened bag 140 formed of Visten and heat sealed at one end to form a bottom closure 142. After the various elements of the apparatus have been adjusted in accordance with the dimensions of the item to be packaged, the fingers are inserted in the bag so that they extend through the entire length of the bag and the bag stretched as previously herein described. Thereafter the item is inserted between the fingers into the stretched bag and the fingers caused to contract. When the bag becomes loose on the fingers, it together with the contents are removed and at this stage of the operation the package is in the form shown in Figure 17. The ear 144 is then lapped over onto one of the panels of the package and sealed thereto as by heat sealing.

The invention provides a package in which the wrap tightly adheres and clings to the contents. Because of this, no interspaces between the wrap and the surface and particularly cut surface of the contents are present and the undesirable effects resulting from interspaces are avoided.

The invention can be used for tightly wrapping or tightly overwrapping or tightly covering various prepared meat food items such as sliced luncheon meats, sliced cooked ham, sliced bacon, sliced sausage, chunks of sausage, rin bologna, blocks of cheese, wedges of cheese, slices of cheese, cut up chicken in a tray, frankfurters, hamburger in a tray, various fresh meat cuts such as pork chops, steaks, pieces of meat as well as whole chickens, ducks, turkeys, geese, whole meat-loaves, smoked butts, whole pieces of sausage such as bologna and liver sausage, whole cooked hams, smoked picnics (shoulder hams), bone-in and boneless smoked hams as well as other similar materials.

In the claims, the term "container" is intended to define tubes or bags as herein described. Since it is obvious that various changes and modifications may be made in the above description, without departing from the nature or spirit thereof, this invention is not restricted thereto except as set forth in the appended claims.

I claim:

1. In a method of providing a tight wrap, the steps which comprise imposing stretching stress by a plurality of stretching fingers directly on opposite inner surfaces of a container formed of an elastic thermoplastic material and having a normal perimeter less than the food item to be packaged therein until the perimeter of said container is greater than that of said item, inserting the item to be packaged in the container while said container is in the stretched state, releasing the stretching stress at a faster rate than the rate of contraction of the elastic material whereby for an interval the container becomes loose around the stretching fingers, removing the container with its inserted food item from the stretching finger during said interval whereupon the container will of its own accord contract until restrained by said item forming a tight wrap.

2. In the method set out in claim 1 wherein the stretching stress is applied transversely of the container.

3. In a method as set out in claim 1 wherein the stretching stress is applied from the interior of the container.

4. In a method as set out in claim 1 wherein one dimension of the container is maintained substantially constant during the stretching operation.

5. In a method as set forth in claim 1 wherein the stretching stress is applied from the interior of the container to only a portion of the length of said container to form a shoulder between the stretched and unstretched portions which limits the movement of and positions the item during the insertion thereof.

6. In a method as set out in claim 1 wherein the elastic thermoplastic material is polyethylene film.

7. In a method as set out in claim 1 wherein the elastic thermoplastic material is a vinyl chloride-vinyl acetate copolymer resin plasticized with a butadiene-acrylonitrile copolymer.

8. In a method as set out in claim 1 wherein the elastic thermoplastic material is a film of plasticized vinyl chloride-vinyl acetate copolymer.

9. In a method as set forth in claim 1 wherein the item is a sausage chunk.

10. In a method of providing a tight wrap around a sausage chunk, the steps which comprise imposing stretching stress directly on opposite inner surfaces of a container formed of an elastic, thermoplastic material and having a normal perimeter less than said sausage chunk to be packaged therein until the perimeter of said container is greater than that of said sausage chunk, said stretching stress being applied from the interior of the container to only a portion of the length of said container to form a shoulder between the stretched and unstretched portions which limits the movement of and positions the sausage chunk during the insertion thereof, inserting the sausage chunk to be packaged in the container while said container is in the stretched state and releasing the stretching stress whereupon the container will of its own accord contract until restrained by said sausage chunk and thereby forming a tight wrap.

11. A packaged food item produced in accordance with the method of claim 1.

12. In a packaging apparatus, a pair of blocks, each block having stretching fingers projecting outwardly therefrom and adapted to be inserted in an elastic container a piston rod secured to one of said blocks and adapted to move it in a direction away and toward the other block whereby the distance between the fingers is respectively increased and decreased, pneumatically actuated means to move said piston in a direction increasing the distance between the fingers on one block and those on the other block and means to move the piston at a controlled rate in the direction decreasing the distance between the fingers on one block and those on the other.

13. In a packaging apparatus, a pair of blocks, each block having stretching fingers projecting outwardly therefrom and adapted to be inserted in an elastic container means to adjust the height of the fingers on each block in accordance with one dimension of the item to be inserted in said elastic container, a piston rod secured to one of said blocks and adapted to move it in a direction away and toward the other block whereby the distance between the fingers is respectively increased and decreased, pneumatically actuated means to move said piston in the direction increasing the distance between the fingers on one block and those on the other block whereby the elastic container positioned thereon will be stretched and means to move the piston at a controlled rate in the direction decreasing the distance between the fingers on one block and those on the other block whereby the stretching stress on said elastic container will be reduced.

14. In an apparatus as set forth in claim 13 means to guide the item to be packaged between said fingers.

15. In a packaging apparatus comprising a pair of blocks, each block having stretching fingers projecting outwardly and adapted to be inserted in a normally flattened elastic container having a perimeter less than that of the item to be packaged therein, means to adjust the height of the fingers on each block in accordance with one dimension of the item to be packaged in said container, the fingers being positioned initially so that the perimeter around them is less than the perimeter of said container whereby they can easily be inserted in said container, a pneumatically actuated piston rod secured to one of said blocks and adapted to move it in a direction to increase the perimeter of the container disposed on said fingers until it is larger than that of said item, and means to move the piston at a controlled rate in the opposite direction to decrease the perimeter about said fingers and permit the container and contents to be removed therefrom.

References Cited in the file of this patent
UNITED STATES PATENTS

| | | |
|---|---|---|
| 2,048,447 | Hewitt | July 21, 1936 |
| 2,348,176 | Gott et al. | May 2, 1944 |
| 2,376,583 | De Poix | May 22, 1945 |
| 2,585,335 | McHale et al. | Feb. 12, 1952 |
| 2,629,214 | McVey | Feb. 24, 1953 |
| 2,685,996 | Shoffner et al. | Aug. 10, 1954 |
| 2,711,848 | Capps | June 28, 1955 |
| 2,713,449 | Carmichael | July 19, 1955 |
| 2,830,909 | Hagen et al. | Apr. 15, 1958 |